(12) United States Patent
Franz et al.

(10) Patent No.: US 10,429,713 B2
(45) Date of Patent: Oct. 1, 2019

(54) SELECTIVELY-TRANSPARENT ELECTROCHROMIC DISPLAY

(71) Applicant: GENTEX CORPORATION, Zeeland, MI (US)

(72) Inventors: Sue F. Franz, Holland, MI (US); Leroy J. Kloeppner, Jenison, MI (US); John A. VanderPloeg, Zeeland, MI (US); David A. Blaker, Holland, MI (US); David A. Theiste, Byron Center, MI (US)

(73) Assignee: GENTEX CORPORATION, Zeeland, MI (US)

( * ) Notice: Subject to any disclaimer, the term of this patent is extended or adjusted under 35 U.S.C. 154(b) by 49 days.

(21) Appl. No.: 14/737,647

(22) Filed: Jun. 12, 2015

(65) Prior Publication Data
US 2015/0362645 A1    Dec. 17, 2015

Related U.S. Application Data

(60) Provisional application No. 62/011,239, filed on Jun. 12, 2014.

(51) Int. Cl.
| | | |
|---|---|---|
| *G02F 1/157* | (2006.01) | |
| *G02F 1/153* | (2006.01) | |
| *G02F 1/163* | (2006.01) | |
| *G02B 5/20* | (2006.01) | |
| *G02B 27/26* | (2006.01) | |
| *G02F 1/1335* | (2006.01) | |

(52) U.S. Cl.
CPC ............. *G02F 1/157* (2013.01); *G02B 5/201* (2013.01); *G02F 1/153* (2013.01); *G02F 1/163* (2013.01); *G02B 27/26* (2013.01); *G02F 1/133514* (2013.01); *G02F 1/133615* (2013.01)

(58) Field of Classification Search
CPC ........................................ G02F 1/15–2001/164
USPC ........................................ 359/265, 267–273
See application file for complete search history.

(56) References Cited

U.S. PATENT DOCUMENTS

| | | | | |
|---|---|---|---|---|
| 5,054,894 | A | * | 10/1991 | Warszawski ............ G02F 1/163 359/265 |
| 5,285,060 | A | | 2/1994 | Larson et al. |
| 6,473,220 | B1 | * | 10/2002 | Clikeman ................ G02B 5/20 359/245 |
| 6,679,617 | B1 | | 1/2004 | Custodis et al. |
| 6,918,674 | B2 | | 7/2005 | Drummond et al. |
| 6,977,712 | B2 | | 12/2005 | Whitted et al. |
| 7,042,616 | B2 | | 5/2006 | Tonar et al. |

(Continued)

OTHER PUBLICATIONS

Marescaux, Matthias. "Electrochromic Displays." ELIS, Universiteit Gent, May 17, 2013, lcp.elis.ugent.be/tutorials/tut_echrom.*

(Continued)

*Primary Examiner* — Zachary W Wilkes
(74) *Attorney, Agent, or Firm* — Price Heneveld LLP; Bradley D. Johnson

(57) ABSTRACT

An electro-optic (EO) display includes one or more adjustable-intensity color filters; a transparent backlight; and a transflective layer positioned between the adjustable-intensity color filter(s) and the transparent backlight, wherein the transflective layer reflects light off of one surface of the transflective layer and allows light through another surface of the transflective layer.

20 Claims, 2 Drawing Sheets

(56) References Cited

U.S. PATENT DOCUMENTS

| | | | |
|---|---|---|---|
| 7,193,666 B2* | 3/2007 | Choi | G02B 5/3083 349/114 |
| 7,253,940 B2 | 8/2007 | Fitzmaurice et al. | |
| 7,259,739 B2 | 8/2007 | Yun et al. | |
| 7,310,178 B2 | 12/2007 | Lawlor et al. | |
| 7,649,669 B2* | 1/2010 | Abe | G02F 1/133514 359/242 |
| 8,077,374 B2* | 12/2011 | Jang | G02F 1/1334 359/267 |
| 8,095,310 B2 | 1/2012 | Taylor et al. | |
| 8,174,489 B2* | 5/2012 | Sorensson | G02F 1/15 345/105 |
| 8,179,236 B2 | 5/2012 | Weller et al. | |
| 8,194,133 B2 | 6/2012 | DeWind et al. | |
| 8,271,187 B2 | 9/2012 | Taylor et al. | |
| 8,300,298 B2 | 10/2012 | Wang et al. | |
| 8,498,038 B2 | 7/2013 | Noh et al. | |
| 8,538,625 B1 | 9/2013 | Lowchareonkul | |
| 8,593,715 B2 | 11/2013 | Yashiro et al. | |
| 9,423,665 B2* | 8/2016 | Lin | G02F 1/163 |
| 9,442,338 B2* | 9/2016 | Uhm | G02F 1/155 |
| 2008/0278792 A1* | 11/2008 | Jang | G02F 1/15 359/266 |
| 2010/0309412 A1 | 12/2010 | Paul | |
| 2011/0187764 A1* | 8/2011 | Bae | G09G 5/10 345/697 |
| 2011/0193872 A1 | 8/2011 | Biernath et al. | |
| 2013/0182307 A1 | 7/2013 | Gillaspie et al. | |

OTHER PUBLICATIONS

Characterization of 3×3 Matrix Arrays of Solution-Phase Electrochromic Cells, Nicholas Leventis, et al; Journal of the Electrochemical Society, vol. 145, No. 4, Apr. 1998.

High Contrast Ratio and Fast-Switching Dual Polymer Electrochromic Devices, Shawn A. Sapp, et al; Chem. Mater. 1998, 10, 2101-2108, Copyright 1998 American Chemical Society.

Advanced electrochromic displays find markets; IDTechEx, Printed Electronics World, www.printedelectronicsworld.com, posted on Mar. 1, 2005.

* cited by examiner

SELECTIVELY-TRANSPARENT ELECTROCHROMIC DISPLAY

CROSS-REFERENCE TO RELATED APPLICATIONS

This application claims priority to U.S. application Ser. No. 62/011,239 filed on Jun. 12, 2014 the entire contents of which are hereby incorporated by reference.

TECHNICAL FIELD

The present invention relates to a selectively-transparent electro-optic (EO) display and, more particularly, to an EO display that uses an adjustable-intensity color filter and an electrochromic shutter.

BACKGROUND

Electro-optic (EO) displays can be used to generate electronic images for viewing. The EO displays generally include a backlight that illuminates displayed images in such a way that the viewer can see them when ambient light is present, such as in the daytime, as well as at nighttime when it is dark. Some EO displays, like liquid crystal displays (LCDs), are designed using a multilayer construction that includes a dark-colored substrate, a light source or backlight, liquid crystals, a plurality of polarizing filters, and one or more color filters. The backlights in LCDs can create light that illuminates the images created by the liquid crystals. However, LCDs have a number of limitations. For instance, LCDs are not transparent. Moreover, the color filters and/or the polarizing filters used in LCDs may block out a significant amount of the light generated by the backlight. To provide an acceptable amount of brightness that overcomes the filters, the LCD uses backlights that consume significant amounts of power. Also, the backlight is needed in both daytime and nighttime operation to illuminate the images created by the liquid crystals. While a backlight helps illuminate images during nighttime, it would be helpful for the EO display to operate using only ambient light rather than the backlight to illuminate images during daytime operation.

SUMMARY

According to an embodiment, a selectively-transparent electro-optic (EO) display includes one or more adjustable-intensity color filters; a transparent backlight; and a transflective layer positioned between the adjustable-intensity color filter(s) and the transparent backlight, wherein the transflective layer reflects light off of one surface of the transflective layer and allows light through another surface of the transflective layer.

According to another embodiment, a selectively-transparent EO display includes one or more adjustable-intensity color filters; a transparent backlight; and an electrochromic shutter separated from the adjustable-intensity color filter(s) by the transparent backlight, wherein the adjustable-intensity color filter(s) and the electrochromic shutter can both adjust a level of light transmission through the EO display.

BRIEF DESCRIPTION OF THE DRAWINGS

One or more embodiments of the disclosure will hereinafter be described in conjunction with the appended drawings, wherein like designations denote like elements, and wherein.

DETAILED DESCRIPTION OF THE ILLUSTRATED EMBODIMENTS

The selectively-transparent electro-optic (EO) display described below includes an electrochromic shutter, a transparent light source or backlight, and one or more adjustable-intensity electrochromic color filters that collectively present images electronically. The selectively-transparent EO display can transition within a range of light permeability from high-transmission—during which the display is completely or substantially transparent to a viewer—to low-transmission that blocks most if not all passage of light through the EO display. Transition within the range can be controlled by the electrochromic shutter and the adjustable-intensity electrochromic color filter(s). As an increasing amount of voltage is applied across transparent electrode films that sandwich each of the electrochromic shutter, the color filter(s), or both, the transparent EO display can become decreasingly transparent.

The electrochromic color filter(s) and the transparent backlight can be separated by a transflective layer, which in this arrangement can reflect light against the adjustable-intensity electrochromic color filter(s) during daytime operation yet permit light generated from the transparent backlight to pass through the transflective layer and illuminate the adjustable-intensity color filter during nighttime operation. The selectively-transparent EO display lacks the polarizing filters commonly found in LCDs thereby permitting a greater amount of light to pass through the display and optionally allow for the use of a lower-intensity backlight. The selectively-transparent EO display can use the transflective layer, the transparent backlight, and the adjustable-intensity electrochromic color filter(s) to operate in a plurality of modes. In a transparent mode, the EO display can be made transparent allowing light to pass through it and a person to look through the EO display much like a window. In a daytime mode, the EO display can generate electronic images using the adjustable-intensity electrochromic color filter(s) when ample ambient light is available. The transflective layer can reflect a sufficient amount of ambient light to illuminate electronic images generated by the EO display during daytime operation. However, the EO display can also operate in a nighttime mode when ambient light is low. The transflective layer can permit light produced by the backlight to pass through the transflective layer so that electronic images generated by the electrochromic color filter(s) can be illuminated by the backlight.

Figure 1:
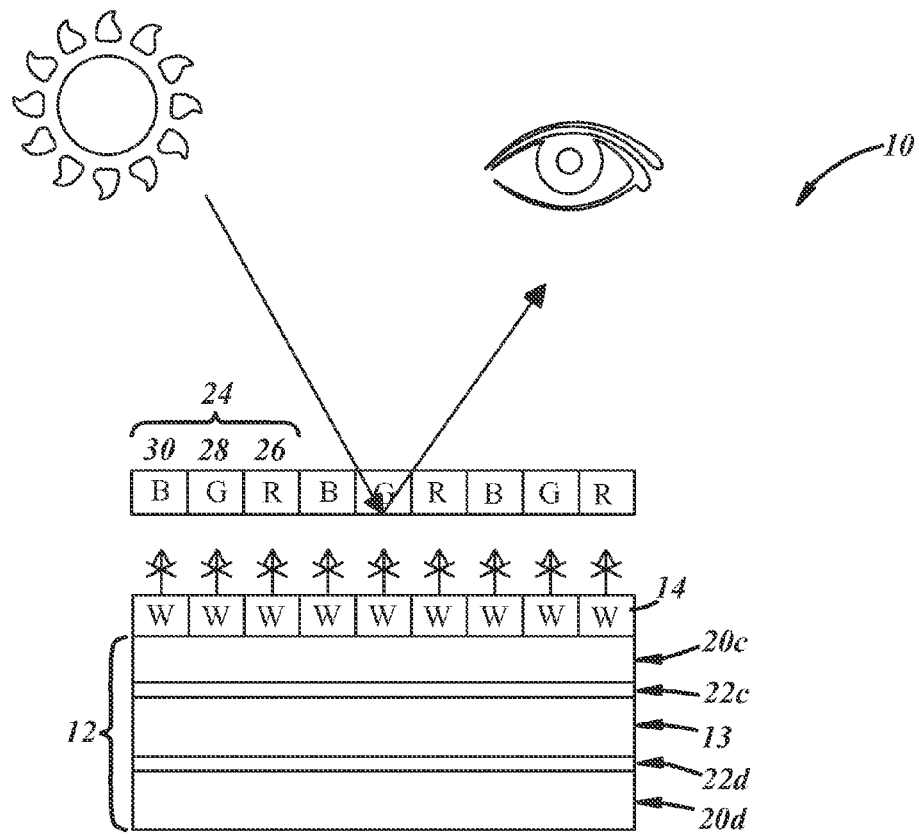
FIG. 1 depicts a cross-section of a portion of a selectively-transparent EO display in one embodiment as it is used when high levels of ambient light are present.
Figure 2:
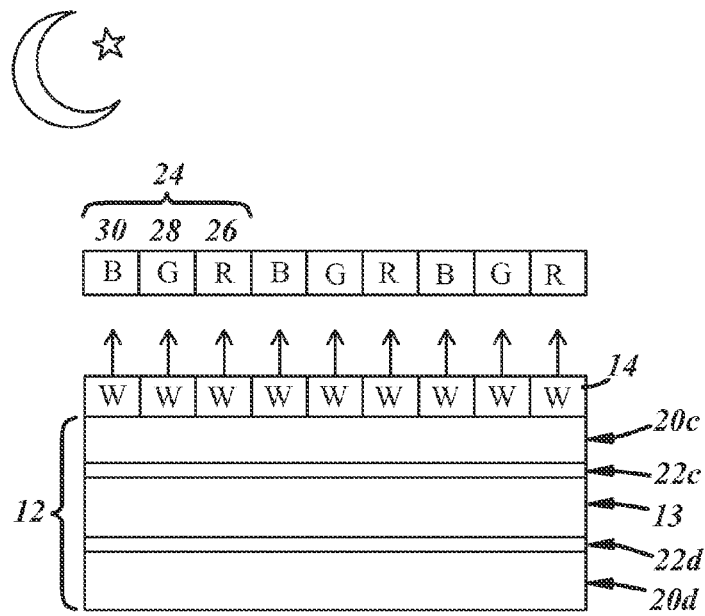
FIG. 2 depicts a cross-section of a portion of a selectively-transparent EO display in one embodiment as it is used when low levels of ambient light are present.

Turning to FIGS. 1 and 2, a cross-section of a portion of an exemplary selectively-transparent electro-optic (EO) display 10 is shown including a plurality of elements in a layered arrangement. FIG. 1 depicts the EO display 10 as it is used in a daytime mode while FIG. 2 depicts the EO display 10 as it is used in a nighttime mode. It should be appreciated that while the selectively-transparent EO display 10 shown in cross-section by FIGS. 1-2 includes three pixels 24, the EO display 10 can be implemented in different pixel dimensions and arrangements such that a wide variety of display sizes can be created and is not limited by what is depicted by the figures.

In this embodiment, the EO display 10 includes an electrochromic shutter 12, a transparent backlight 14, and one or more adjustable-intensity electrochromic color filters 26, 28, and 30. A power source (not shown) can provide electrical power to the selectively-transparent EO display 10 so that voltage and current can be directed to each segment or portion of the pixel 24 thereby controlling electronic images that are presented via the EO display 10.

The electrochromic shutter 12 can be configured to selectively provide a contrasting background having a range of light transmission from nearly transparent to low-transmission. The state of the electrochromic shutter 12 can be controlled by the absence or presence of voltage. Placing the electrochromic shutter 12 in a transparent state permits light to pass through the shutter 12. In this embodiment, the absence of voltage to the electrochromic shutter 12 can place the EO display 10 in a transparent state. Absence of voltage can mean zero volts (V) or near zero volts applied to the electrochromic shutter 12. The transparent state can occur when the EO display 10 is not displaying images and is in the transparent mode. To enhance displayed images, the electrochromic shutter 12 can be controlled to decrease light transmission by applying a voltage to the shutter 12 across two transparent electrode film layers 22c and 22d that are deposited on transparent substrates 20c and 20d positioned on opposite sides of an electrochromic medium 13. The electrochromic shutter 12 can darken to provide a contrasting background upon which images generated by the adjustable-intensity electrochromic color filters 26, 28, and 30 and transparent backlight 14 can be displayed. Depending on the implementation, the electrochromic shutter 12 can be colored black or gray to provide an adequate contrast with the color filters 26, 28, and 30.

The transparent backlight 14 can be transparent when not producing light and illuminate images generated by the adjustable-intensity electrochromic color filters 26, 28, and 30 when lit. In one implementation, the transparent backlight 14 can include a plurality of organic light-emitting diodes (OLEDs) that are transparent or substantially transparent. Transparent OLEDs can each include a transparent substrate, an anode, a cathode, and an emissive layer all of which are substantially transparent. When the selectively-transparent EO display 10 is operating in a daytime mode, the transparent backlight 14 can be placed in a transparent state in which voltage is not applied to the transparent backlight 14. In nighttime mode, the transparent backlight 14 can be directed to change state from transparent to illuminated during which time a voltage can be applied to the anode and cathode of the OLEDs. The intensity of the illumination can be controlled by an amount of voltage applied to the backlight 14. It is possible to vary the intensity of light generated by the transparent backlight 14 as needed. In some implementations, the transparent backlight 14 can vary in intensity independently of the intensity of the adjustable-intensity electrochromic filters 26, 28, and 30. While the transparent backlight 14 shown in the figures includes individual pixels, it is possible to implement the transparent backlight 14 without individual pixels. Other embodiments of the selectively-transparent EO display 10 can use transparent backlights other than those made up of OLEDs. For example, the transparent backlight 14 can be implemented as a transparent edge-lit substrate. More specifically, the transparent substrate could be an edge-lit acrylic panel equipped with a plurality of LEDs.

Figures 3A, 3B:
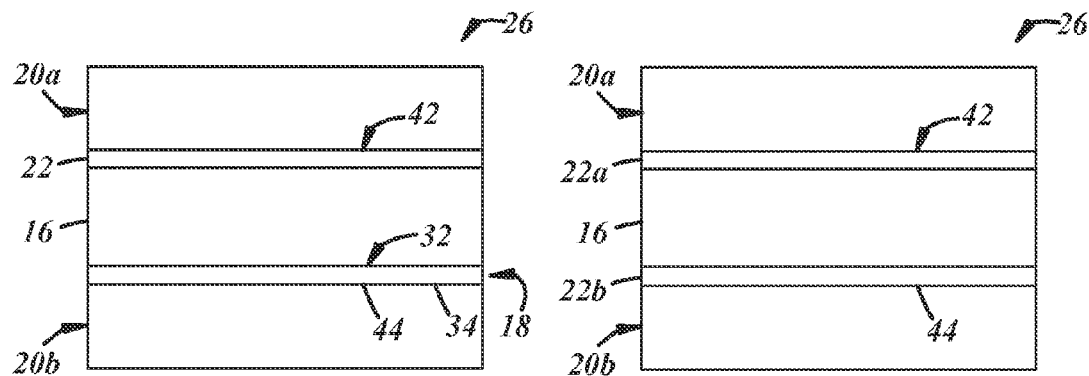
FIG. 3a depicts a cross-section of a portion of an adjustable-intensity color filter with a transflective layer as it is used in one embodiment.
FIG. 3b depicts a cross-section of a portion of an adjustable-intensity color filter as it is used in another embodiment.

The adjustable-intensity electrochromic color filters can be arranged by individual pixels 24 comprising a red electrochromic color filter 26, a green electrochromic color filter 28, and a blue electrochromic color filter 30 placed in a horizontal or side-by-side arrangement in each pixel 24. The color filters 26, 28, and 30 can be constructed in a layered arrangement that FIGS. 3a and 3b depict in more detail. In FIG. 3a, an implementation of the red electrochromic color filter 26 of the pixel 24 is shown. The red electrochromic color filter 26 includes a first transparent substrate 20a and a second transparent substrate 20b positioned on opposite sides of an electrochromic medium 16. While FIG. 3a depicts a portion or segment of the pixel 24 used for displaying red colors, the structure shown can also be configured to display other colors, such as green, blue, cyan, magenta, or yellow. A transparent electrode film 22, such as indium tin oxide (ITO), can be applied to one side 42 of the first transparent substrate 20a and located between the first transparent substrate 20a and the electrochromic medium 16. The transflective layer 18 can be applied to one side 44 of the second transparent substrate 20b. When assembled, the electrochromic medium 16 is located between the transflective layer 18 and the transparent electrode film 22. The pixels 24 can be individually controlled or commanded to display one or more colors and so that a plurality of pixels 24 collectively generate an image. In some embodiments, the preferred pixel colors may be selected from red, green, and blue while in other embodiments colors can be selected from cyan, magenta, and yellow. It should be appreciated that the electrochromic shutter 12 and the adjustable-intensity electrochromic filters 26, 28, and 30 can be implemented in different ways. In one example, the electrochromic shutter 12 and the color filters 26, 28, and 30 can be implemented using solution phase electrochromic devices that use anodic and cathodic dyes described in U.S. Pat. No. 5,998,617 titled "Electrochromic Compounds," which is incorporated by reference.

Figure 4:
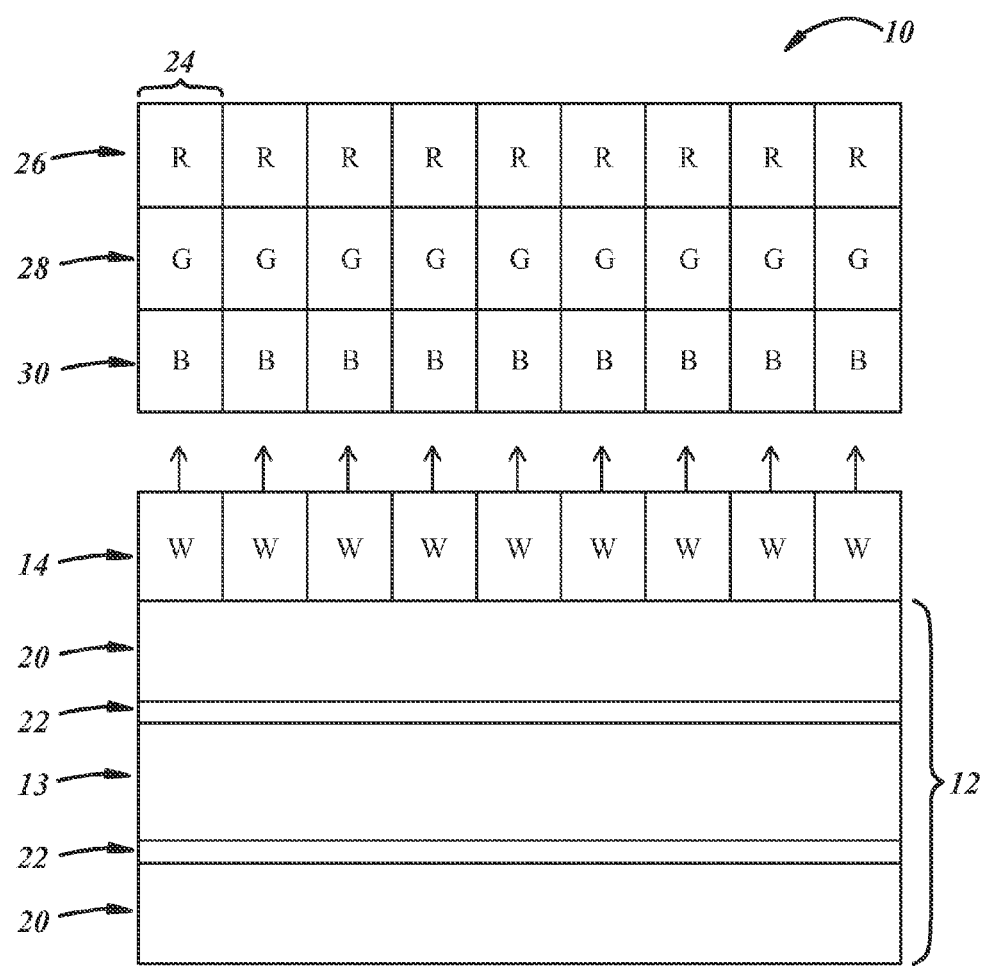
FIG. 4 depicts a cross-section of a portion of a selectively-transparent EO display in one embodiment.

FIG. 3b depicts another implementation of the red electrochromic color filter 26 of the pixel 24 used for displaying red colors. The structure shown can also be configured to display other colors, such as green, blue, cyan, magenta, or yellow. A first transparent electrode film 22a can be applied to one side 42 of the first transparent substrate 20a and located between the first transparent substrate 20a and the electrochromic medium 16. A second transparent electrode film 22b can be applied to one side 44 of the second transparent substrate 20b. When assembled, the electrochromic medium 16 is located between the electrode films 22a and 22b. The pixels 24 can be individually controlled or commanded to display one or more colors and so that a plurality of pixels 24 collectively generate an image. In some embodiments, the preferred pixel colors may be selected from red, green, and blue while in other embodiments colors can be selected from cyan, magenta, and yellow. This arrangement is preferred when the color filters 26, 28 and 30 are aligned vertically as shown in FIG. 4. More specifically, the configuration depicted in FIG. 3b may be employed for the two color filters that are furthest away from the backlight 14, which would be the color filters 26 and 28 shown in FIG. 4.

As shown in FIG. 3a, the transflective layer 18 can be positioned within one of the adjustable-intensity electrochromic color filters 26, 28 and 30. When the EO display 10 is placed in a daytime mode, the transparent backlight 14 can be turned "off" so that it does not generate light to illuminate the color filters 26, 28 and 30. Ambient light, such as sunlight, can pass through the transparent substrate 20a, the transparent electrode film 22, and the electrochromic medium 16 reflecting off of the surface 32 of the transflective layer 18. The reflected light can then illuminate the images generated by the color filters 26, 28 and 30. In contrast, a nighttime mode can be used by the EO display 10 when ambient light is low. Rather than reflecting ambient light off of the surface 32 of the transflective layer 18, the transparent backlight 14 can be turned "on" to generate light, which can be permitted to pass through both surface 32 and surface 34 of the transflective layer 18 and illuminate the color filters 26, 28 and 30 as is shown in FIG. 2. Transflective layers 18 can be implemented in different ways, one of which is described by U.S. Pat. No. 8,035,881 titled "Multi-zone Mirrors" the contents of which are incorporated by reference.

A cross-section of another exemplary EO display 10 is shown in FIG. 4 that includes the electrochromic shutter 12, the transparent backlight 14, and adjustable-intensity electrochromic color filters 26, 28 and 30. In this implementation, each pixel 24 includes a homogeneous layer of red electrochromic color filters 26, a homogeneous layer of green electrochromic color filters 28, and a homogeneous layer of blue electrochromic color filters 30 such that the layers are stacked on top of each other in a vertical arrangement. In this embodiment, the homogeneous layers are shown using red, green, and blue electrochromic color filters, however, it is possible to use other colors, such as cyan, magenta, and yellow. The homogeneous layers can be formed in a number of different ways as is described in U.S. Pat. No. 7,450,291 titled "Multi-cell Electrochromic Devices" the contents of which are incorporated by reference. Optionally a $4^{th}$ layer generally perceived as black or achromic may be added to provide enhanced contrast.

In one experiment, six different adjustable-intensity electrochromic color filters 26, 28, and 30 that can be used in an EO display 10 were constructed as shown in FIG. 3b. The transparent electrode films 22a and 22b were spaced apart from each other by a perimeter seal and the space of each cell filled with a different solution dissolved in propylene carbonate. The filters were colored by applying 1.2 V across the transparent electrode films 22a and 22b and the color transmitted by each cell was measured using the CIE standard illuminant D65 and a 10 degree standard observer. The results for each cell are disclosed below. The variables u' and v' reflect values on a CIELUV color space.

not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An electro-optic (EO) display, comprising:
one or more adjustable-intensity electrochromic color filters that each include a first electrochromic medium situated between opposed first and second transparent substrates;
a transparent backlight;
a transflective layer, comprising an optical film and in optical communication with the transparent backlight, the transflective layer disposed on a first surface of the second transparent substrate and positioned within the one or more adjustable-intensity electrochromic color filters such that the transflective layer is located between the electrochromic mediums of the one or more adjustable-intensity electrochromic color filters and the transparent backlight, wherein the transflective layer reflects light off of one surface of the transflective layer and allows light through another surface of the transflective layer; and
an electrochromic shutter separated from the one or more adjustable-intensity electrochromic color filters by the transparent backlight;
wherein the electrochromic shutter is configured to provide a variable range of light transmission;
wherein the electrochromic shutter has a second electrochromic medium disposed between a third transparent substrate and a fourth transparent substrate;

| Cathodic Dye | Anodic Dye | u' | v' | Perceived Color |
|---|---|---|---|---|
| 10 mM phenylpropyl phenyl di-viologen | 15 mM Ferrocene | 0.2236 | 0.4889 | Pink |
| 15 mM 1,1'bis-3-phenyl-propyl viologen | 15 mM 5,10Dimethyl-5,10-dihydrophenazine | 0.1373 | 0.4727 | Blue-green (cyan) |
| 15 mM 1,1'diphenyl viologen | 15 mM Ferrocene | 0.1454 | 0.5323 | Green |
| 15 mM 2,2',6,6'-tetramethyl 1,1'-dibenzyl viologen | 15 mM tetramethyl paraphenylene diamine | 0.1457 | 0.2989 | Blue |
| 15 mM 1,1'-bis-2phenylethyl viologen | 5,10 diisopropyl-5,10dihydro phenazine | 0.2329 | 0.4117 | Violet (Magenta) |
| 20 mM 2,2-dimethyl bipyridium | 20 mM 1,6-dimethoxy-5,10-dimethyl-5,10dihydrophenazine | 0.2022 | 0.5324 | Yellow |

It is to be understood that the foregoing is a description of one or more embodiments of the invention. The invention is wherein the EO display is configured to selectively operate in a first mode in which light is produced by the transparent backlight and passes through the transflective layer, thereby illuminating the electrochromic color filters;

wherein the EO display is configured to selectively operate in a second mode in which the transflective layer reflects ambient light to illuminate the electrochromic color filters; and wherein the EO display is configured to selectively operate in a third mode in which one or more of the adjustable-intensity electrochromic color filters and the electrochromic shutter are in a transparent state and the EO display is configured to allow light to pass through the EO display.

2. The EO display of claim 1, wherein the one or more adjustable-intensity electrochromic color filters further comprise a transparent electrode film that is applied to the first transparent substrate and located between the first transparent substrate and the electrochromic medium.

3. The EO display of claim 1, wherein the intensity of the transparent backlight is adjustable independently from the level of light transmission of the one or more adjustable-intensity electrochromic color filters.

4. The EO display of claim 1, wherein the transparent backlight further comprises a plurality of pixels.

5. The EO display of claim 1, wherein the one or more adjustable-intensity electrochromic color filters comprise at least a cyan electrochromic color filter, a yellow electrochromic color filter, and a magenta electrochromic color filter.

6. The EO display of claim 1, wherein the one or more adjustable-intensity electrochromic color filters comprises at least a red electrochromic color filter, a green electrochromic color filter, and a blue electrochromic color filter.

7. The EO display of claim 1, wherein a plurality of the one or more adjustable-intensity electrochromic color filters is arranged in homogeneous layers in one pixel.

8. The EO display of claim 1, further comprising a homogeneous black layer.

9. The EO display of claim 1, wherein a plurality of the one or more adjustable-intensity electrochromic color filters is arranged in a horizontal arrangement in one pixel.

10. The EO display of claim 1, wherein the transflective layer is disposed between and adjacent to the electrochromic medium and the first surface of the second transparent substrate.

11. The EO display of claim 1, wherein, in the first mode, the electrochromic shutter is in at least a partially darkened state.

12. An electro-optic (EO) display, comprising:
one or more adjustable-intensity electrochromic color filters that each include a first electrochromic medium situated between a transparent electrode film applied to a first transparent substrate and a second transparent substrate that is opposed to the first transparent substrate;
a transflective layer, comprising an optical film, positioned within each of the one or more adjustable-intensity electrochromic color filters between the electrochromic medium and the second transparent substrate;
a transparent backlight; and
an electrochromic shutter, comprising a second electrochromic medium disposed between a third transparent substrate and a fourth transparent substrate, separated from the one or more adjustable-intensity electrochromic color filters by the transparent backlight, wherein the one or more adjustable-intensity electrochromic color filters and the electrochromic shutter can both adjust a level of light transmission through the EO display;

wherein the EO display is configured to selectively operate in a transparent mode in which the electrochromic shutter and one or more adjustable-intensity electrochromic color filters are in a transparent state; and wherein the EO display is configured to selectively operate in a transmissive mode in which the one or more adjustable-intensity electrochromic color filters are configured to generate images and the electrochromic shutter is in at least a partially darkened state.

13. The EO display of claim 12, wherein the intensity of the transparent backlight is adjustable independently from a level of light transmission of the one or more adjustable-intensity electrochromic color filters.

14. The EO display of claim 12, wherein the transparent backlight further comprises a plurality of pixels.

15. The EO display of claim 12, wherein the one or more adjustable-intensity electrochromic color filters further comprise at least a cyan electrochromic color filter, a yellow electrochromic color filter, and a magenta electrochromic color filter.

16. The EO display of claim 12, wherein the one or more adjustable-intensity electrochromic color filters further comprise a red electrochromic color filter, a green electrochromic color filter, and a blue electrochromic color filter.

17. The EO display of claim 12, wherein a plurality of the one or more adjustable-intensity electrochromic color filters is arranged in homogeneous layers in one pixel.

18. The EO display of claim 17, further comprising a homogeneous black layer.

19. The EO display of claim 12, wherein a plurality of the one or more adjustable-intensity electrochromic color filters is arranged in a horizontal arrangement in one pixel.

20. The EO display of claim 12, wherein the transmissive mode comprises a daylight mode in which the transflective layer is configured to selectively reflect ambient light to the one or more adjustable-intensity electrochromic color filters; and wherein the transmissive mode further comprises a nighttime mode in which the transparent backlight is configured to selectively provide light to the one or more adjustable-intensity electrochromic color filters.

* * * * *